(12) United States Patent
Mori et al.

(10) Patent No.: US 11,020,824 B2
(45) Date of Patent: Jun. 1, 2021

(54) ALUMINUM ALLOY CLAD MATERIAL

(71) Applicants: Mitsubishi Aluminum Co., Ltd., Minato-ku (JP); DENSO CORPORATION, Kariya (JP)

(72) Inventors: Yoshiki Mori, Kitamoto (JP); Hideyuki Miyake, Susono (JP); Michihide Yoshino, Susono (JP); Shohei Iwao, Susono (JP); Masakazu Edo, Susono (JP); Naoki Sugimoto, Anjo (JP); Nobuhiro Honma, Chita-gun (JP); Shogo Yamada, Nagoya (JP); Hayaki Teramoto, Okazaki (JP); Taketoshi Toyama, Anjo (JP)

(73) Assignees: Mitsubishi Aluminum Co., Ltd., Minato-ku (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 16/916,469

(22) Filed: Jun. 30, 2020

(65) Prior Publication Data
US 2021/0001435 A1  Jan. 7, 2021

(30) Foreign Application Priority Data
Jul. 3, 2019 (JP) .............................. JP2019-124416

(51) Int. Cl.
*B23K 35/28* (2006.01)
*C22C 21/02* (2006.01)
*B23K 35/02* (2006.01)
*B32B 15/01* (2006.01)
*B23K 101/14* (2006.01)

(52) U.S. Cl.
CPC ........ *B23K 35/286* (2013.01); *B23K 35/0238* (2013.01); *B32B 15/016* (2013.01); *C22C 21/02* (2013.01); *B23K 2101/14* (2018.08)

(58) Field of Classification Search
None
See application file for complete search history.

(56) References Cited

U.S. PATENT DOCUMENTS

2018/0169798 A1\* 6/2018 Izumi .................. B23K 35/288

FOREIGN PATENT DOCUMENTS

JP         4547032 B1    9/2010
JP      2014-050861 A    3/2014

\* cited by examiner

*Primary Examiner* — Daniel J. Schleis
(74) *Attorney, Agent, or Firm* — Oblon, McClelland, Maier & Neustadt, L.L.P.

(57) ABSTRACT

An Al—Si—Mg—Bi-based brazing material containing Si: 6.0% to 14.0%, Fe: 0.05% to 0.3%, Mg: 0.02% to 1.5%, Bi: 0.05% to 0.25%, Sr: 0.0001% to 0.1%, and a balance of Al and inevitable impurities, and satisfies (Bi+Mg)×Sr≤0.1, is disposed on both surfaces of a core material, Mg—Bi-based compounds of the brazing material with a diameter of 0.1 µm or more and less than 5.0 µm in terms of equivalent circle diameter are more than 20 in number in 10,000 µm$^2$ and the Mg—Bi-based compounds with diameter of 5.0 µm or more are less than 2 in number in 10,000 µm$^2$, the core material contains Mn: 0.8% to 1.8%, Si: 0.01% to 1.0%, Fe: 0.1% to 0.5%, and a balance of Al and inevitable impurities, and a cathode current density of a brazing material layer after a brazing heat treatment is 0.1 mA/cm$^2$ or less.

23 Claims, 2 Drawing Sheets

LOCATIONS FOR EVALUATING WIDTH OF JOINT PART

ALUMINUM ALLOY CLAD MATERIAL

BACKGROUND OF THE INVENTION

Field of the Invention

This invention relates to an aluminum alloy clad material for flux-free brazing which is joined without a flux.

Priority is claimed on Japanese Patent Application No. 2019-124416 filed on Jul. 3, 2019, the content of which is incorporated herein by reference.

Description of Related Art

As the size and weight of aluminum heat exchangers for vehicles such as condensers and evaporators have been reduced, thinning and high-strengthening of aluminum materials have proceeded. In the manufacturing of aluminum heat exchangers, brazing is performed to join joints. However, in a brazing method using the current mainstream fluoride-based flux, the flux reacts with Mg in a material to be deactivated and is likely to cause brazing defects, so that the use of a Mg-added high strength member is limited. Therefore, a brazing method of joining a Mg-added aluminum alloy without using a flux is desired.

In flux-free brazing using an Al—Si—Mg brazing material, Mg in the brazing material that has been melted and activated reduces and decomposes an Al oxide film ($Al_2O_3$) on the surface of a joint, whereby joining is achieved. In a closed surface joint or the like, a good joined state is obtained at a joint where brazing sheets having brazing materials are combined by a decomposition action of an oxide film by Mg, and a joint where a brazing sheet and a member (bare material) to be joined which does not have a brazing material are combined (refer to Japanese Patent (Granted) Publication No. 4547032).

However, a tube-fin joint, which is a representative joint shape of a general heat exchanger such as a condenser and an evaporator, is easily affected by an atmosphere, and a MgO film tends to grow on the surface of a Mg-added brazing material. Since the MgO film is a stable oxide film that is less likely to be decomposed, joining is significantly impeded.

Therefore, in order to apply a flux-free technique to a general heat exchanger, a brazing sheet for flux-free brazing capable of obtaining a stable joined state at a joint having an open portion is strongly desired.

In the related art, as a method for stabilizing a joined state of flux-free brazing, for example, a technique in which an Al—Si—Mg—Bi-based brazing material described in Japanese Unexamined Patent Application, First Publication No. 2014-50861 is used to control a distributed state of Bi particles and Mg—Bi compound particles in the brazing material is proposed. According to this technique, it is considered that by dispersing simple Bi or a Bi—Mg compound having an equivalent circle diameter of 5.0 to 50 μm in the brazing material, these compounds are exposed to the surface of the brazing material during the manufacturing of a material, and the formation of ah oxide film at the exposed portion is thus suppressed, so that flux-free brazability within a short braze heating time is improved.

SUMMARY OF THE INVENTION

However, it is difficult to say that joinability that is stable enough to replace the brazing method using the current mainstream fluoride-based flux is obtained, and a further technical improvement is necessary for wide application to general heat exchangers.

The present invention has been made based on the above circumstances, and an object thereof is to provide an aluminum alloy clad material for flux-free brazing with which brazing can be stably performed without a flux.

Solution to Problem

Therefore, the present inventors conducted intensive examinations in view of the above problems, and as a result, found that it is most important to uniformly concentrate Bi on the surface during braze melting in order to further improve brazability in a Bi-added Al—Si—Mg-based brazing material. In addition, although a coarse Mg—Bi compound of 5 μm or more is effective in suppressing the generation of an oxide film during manufacturing of a material, it is difficult to dissolve the Mg—Bi compound during braze heating, but by dispersing a rather fine Bi—Mg compound of 0.1 μm or more and less than 5.0 μm to a predetermined number density or more, the Mg—Bi compound is reliably dissolved during the braze heating to generate metal Bi. As the generated Bi is uniformly concentrated on the surface, good brazability is obtained.

Furthermore, the relationship between a braze melting behavior in flux-free brazing and brazability was investigated, and it was important to generate an active molten braze within a short period of time and form a fillet while suppressing oxidation in the flux-free brazing. Therefore, since a brazing material having a low liquidus temperature and a short solid-liquid coexistence region was preferable, it became clear that a high Si brazing material is preferable, a method to suppress coarse primary phase Si generated during casting, which is a problem with the high Si brazing material was examined.

Furthermore, in a brazing sheet after brazing, the surface of a material is covered with a braze, and furthermore, the braze consists of eutectic and primary phases. Since the eutectic phase is prone to corrosion and corrosion proceeds in a core material after the eutectic phase has preferentially corroded, there is a problem that the corrosion form is likely to be local corrosion and the corrosion resistance is likely to be reduced. This effect is particularly significant in a thin clad fin.

Here, the corrosion resistance has also been examined. In an Al—Si—Mg—Bi brazing material, Bi concentrates on the surface during brazing and crystallizes as a Mg—Bi compound during the subsequent cooling process. The crystallized Mg—Bi compound is different from the aluminum primary phase in electrochemical properties and thus acts as a starting point of corrosion. Therefore, in the Al—Si—Mg—Bi brazing material in which the dispersed state of the Mg—Bi compound before brazing is optimized as described above, Bi concentrated on the surface during brazing is uniformized. Furthermore, the uniformized Bi is crystallized as a uniform Mg—Bi compound during solidification after the brazing. Therefore, it was found that in such a state, the starting point of corrosion in the braze is not only in the eutectic phase but also everywhere due to the addition of the Mg—Bi compound, so that the form of corrosion is not localized but uniform and the corrosion resistance of the clad fin material is improved.

Furthermore, it was found that by controlling additive elements and addition amounts to cause a cathode current density of a brazing material after brazing to be a predetermined value or less, the corrosion acceleration of the brazing material layer is suppressed, and the corrosion resistance of the clad fin material is further improved.

Furthermore, repeated examinations were intensively conducted on the components of a core material, and by optimizing the components and combining the core material with the Al—Si—Mg—Bi brazing material in which the dispersed state of the Mg—Bi compound is appropriately controlled as described above, a clad fin material for flux-free brazing with which a stable joined state is obtained at a joint having an opening portion and excellent corrosion resistance and strength are achieved after brazing was invented.

That is, among aluminum alloy clad materials according to the present invention, a first aspect is an aluminum alloy clad material including: an Al—Si—Mg—Bi-based brazing material disposed on both surfaces of a core material, the Al—Si—Mg—Bi-based brazing material containing, by mass %, Si: 6.0% to 14.0%, Fe: 0.05% to 0.3%, Mg: 0.02% to 1.5%, Bi: 0.05% to 0.25%, Sr: 0.0001% to 0.1%, and a balance consisting of Al and inevitable impurities and satisfying a relationship of (Bi+Mg)×Sr≤0.1 in amounts of elements by mass %, in which Mg—Bi-based compounds contained in the Al—Si—Mg—Bi-based brazing material and having a diameter of 0.1 μm or more and less than 5.0 μm in terms of equivalent circle diameter are more than 20 in number per 10,000-μm$^2$ visual field and the Mg—Bi-based compounds having a diameter of 5.0 μm or more are less than 2 in number per 10,000-μm$^2$ visual field when observed in a surface layer plane direction before brazing, and the core material contains, by mass %, Mn: 0.8% to 1.8%, Si: 0.01% to 1.0%, Fe: 0.1% to 0.5%, and a balance consisting of Al and inevitable impurities, and a cathode current density of a brazing material layer measured at room temperature in a 5% NaCl solution at a pH of 3 after a brazing heat treatment is 0.1 mA/cm$^2$ or less.

In an invention of an aluminum alloy clad material of a second aspect, in the invention of the above aspect, the core material further contains, by mass %, Cu: 0.005% to 0.3%.

In an invention of an aluminum alloy clad material of a third aspect, in the invention of the above aspect, the core material further contains, by mass %, Mg: 0.1% to 0.7%.

In an invention of an aluminum alloy clad material of a fourth aspect, in the invention of the above aspect, the core material further contains, by mass %, Zn: 0.2% to 1.6%.

In an invention of an aluminum alloy clad material of a fifth aspect, a concentration of Mg on a surface of the brazing material at a braze melting temperature is in a range of 0.15% to 1.0%.

Hereinafter, the content specified by the present invention will be described together with the actions thereof.

All the components described below are shown in mass %.

Brazing Material

Brazing materials are disposed on both surfaces of a core material and respectively have the following conditions. However, the brazing materials on both surfaces may have different compositions.

Si: 6.0% to 14.0%

Si is added to form a molten braze during brazing and form a fillet at a joint. In flux-free brazing at an open portion, it is important to generate an active molten braze within a short period of time and form a fillet while suppressing oxidation. Therefore, a brazing material having a low liquidus temperature and a short solid-liquid coexistence region is preferable. When the Si content is less than the lower limit, the time for generating the molten braze increases, and the molten braze is insufficient. On the other hand, when the Si content exceeds the upper limit, the time for generating the molten braze also increases and a material becomes hard and brittle, making it difficult to manufacture the material. Therefore, the S content is set to be in the above range.

For the same reason, it is desirable that the Si content is set to 6.5% at the lower limit and 13% at the upper limit Fe: 0.05% to 0.3%

Fe improves the strength of the material by precipitating as an intermetallic compound such as Al—Mn—Fe and Al—Mn—Si—Fe. In a case where the amount of Fe added is large, a large amount of Fe compounds are generated, and corrosion resistance deteriorates. Therefore, the Fe content is set to be in the above range. When the Fe content is less than the lower limit, the effect is insufficient. When the Fe content exceeds the upper limit, the amount of the intermetallic compound generated is large, and the corrosion resistance deteriorates.

For the same reason, it is desirable that the lower limit thereof is set to 0.10% and the upper limit thereof is set to 0.20%.

Mg: 0.02% to 1.5%

Mg is added to reduce and decompose an Al oxide film ($Al_2O_3$). When the Mg content is less than the lower limit, the effect is insufficient. When the Mg content exceeds the upper limit, Mg reacts with oxygen in a brazing atmosphere and generates MgO that impedes joining, and the material becomes hard and brittle, making it difficult to manufacture the material. Therefore, the Mg content is set to be in the above range.

For the same reason, the Mg content is desirably set to 0.03% at the lower limit and 1.2% at the upper limit, and more desirably set to 0.1% at the lower limit and 1.0% at the upper limit.

Bi: 0.05% to 0.25%

Bi is added to suppress oxidation during brazing by concentrating on the surface of the material in a brazing temperature rising process, and to improve the joinability at an open portion by reducing the surface tension of the molten braze. When the Bi content is less than the lower limit, the effect is insufficient. When the Bi content exceeds the upper limit, not only be the effect saturated, but also Bi oxides are easily generated on the material surface, thereby impeding joining. Therefore, the Bi content is set to be in the above range.

For the same reason, it is desirable that the Bi content is set to 0.08% at the lower limit and 0.23% at the upper limit.

Sr: 0.0001% to 0.1%

Sr is added to suppress the generation of coarse primary phase Si generated in a brazing material having a high Si content. When the Sr content is less than the lower limit, the effect is insufficient. When the Sr content exceeds the upper limit, Sr is oxidized on the surface of a molten metal during casting and the amount of dross increases, or coarse compounds are formed and castability decreases. Therefore, the Sr content is set to be in the above range.

For the same reason, it is desirable that the Sr content is set to 0.0005% at the lower limit and 0.06% at the upper limit.

(Bi+Mg)×Sr≤0.1

An Al—Si—Mg—Bi-based brazing material for flux-free brazing contains active Mg and Bi. Therefore, when the Al—Si—Mg—Bi-based brazing material coexists with a certain amount or more of Sr, a coarse Bi—Mg—Sr compound is generated in the molten metal during casting, so that castability decreases. This compound becomes easier to generate as the total amount of Bi and Mg increases and as the Sr content increases. (Bi+Mg)×Sr in terms of mass % indicates the critical condition for the generation of this coarse Bi—Mg—Sr compound. By setting (Bi+Mg)×Sr to 0.1 or less, a coarse Bi—Mg—Sr compound is not generated even when Sr is added to the Al—Si—Mg—Bi-based brazing material, and the effect of suppressing the generation of primary phase Si, which is the original purpose of the addition of Sr, can be obtained. Therefore, (Bi+Mg)×Sr is set to be in the above range.

For the same reason, it is desirable that (Bi+Mg)×Sr 0.08 is satisfied.

Mn: 0.05% to 0.3%

Mn improves the material strength by precipitating as an intermetallic compound such as Al—Mn—Fe and Al—Mn—Si—Fe, so that Mn is contained as desired. In a case where the amount of Mn added is large, a large amount of Mn compounds are generated, and the corrosion resistance deteriorates. Therefore, the Mn content is set to be in the above range. When the Mn content is less than the lower limit, the effect is insufficient. When the Mn content exceeds the upper limit, the amount of the intermetallic compound generated is large, and the corrosion resistance deteriorates.

For the same reason, it is desirable that the lower limit thereof is set to 0.10% and the upper limit thereof is set to 0.20%.

In a case where Mn is not positively added, Mn may be contained as an inevitable impurity in less than 0.05%.

Mg—Bi-based Compounds: Those Having Diameter of 0.1 to Less Than 5.0 μm in Terms of Equivalent Circle Diameter Are More Than 20 in Number per 10,000-μm² Visual Field Dispersion of fine Mg—Bi-based compounds facilitates uniform concentration of Bi on the material surface when the compound melts in the brazing temperature rising process, and thus suppresses the oxidation of the material. Furthermore, Bi distributed on the surface of the material crystallizes as an Mg—Bi compound in a cooling process after brazing. This compound is significantly different from the primary phase in electrochemical properties and becomes a starting point of corrosion. Since the Mg—Bi compound is uniformly crystallized from the uniformly distributed Bi, the starting point of corrosion is not a specific point on the surface of the material but is dispersed as a whole, so that the form of corrosion is improved.

Even if compounds of less than 0.1 μm are dissolved, the above effect cannot be obtained because the dissolved amount is insufficient. Compounds of 5.0 μm or more are difficult to melt in the brazing temperature rising process and remain as compounds, so that the above effect cannot be obtained. Furthermore, when the compounds are 20 or less in number per 10,000-μm² visual field, the number of dissolved portions is insufficient, and Bi is difficult to be uniformly concentrated on the material surface.

For the same reason, the number thereof is desirably 30 or more, and more preferably 40 or more.

For example, the number of particles of the Mg—Bi-based compounds on the surface of the brazing material is obtained by subjecting the surface of the brazing material of the produced material to a mirror finish with 0.1-μm abrasive grains, performing fully automatic particle analysis using a field emission electron beam microanalyzer (FE-EPMA), producing a thin film from the surface of a brazing material layer, which is cut, by performing mechanical polishing and electrolytic polishing in order to measure fine compounds of 1 μm or less, observing the thin film with a transmission electron microscope (TEM), and counting the number of particles of the Mg—Bi-based compounds of 0.1 to 5.0 μm in an observation visual field of 10,000 μm² (100-μm square) in a surface direction.

As means for finely and densely distributing the Mg—Bi-based compounds, adjustment can be achieved by appropriately combining, during casting, performing the casing at a high cooling rate from a high molten metal temperature (coarse crystallization of the Mg—Bi compounds is suppressed, solid solution of Mg and Bi during the casting is promoted, and Mg and Bi are dispersed in a desired state by subsequent heat treatments), during hot rolling, taking a large total reduction rate of a certain level or more (refinement and an increase in number density are achieved by promoting crushing of crystallized products), taking a long rolling time in a high temperature range (dynamic precipitation during hot rolling is promoted), reducing a hot rolling finish temperature and increasing the subsequent cooling rate (coarse precipitation due to slow cooling is suppressed), and the like.

Mg—Bi-based Compounds: Those Having Diameter of 5.0 μm or More in Terms of Equivalent Circle Diameter Are Less Than 2 in Number per 10,000-μm² Visual Field Coarse Mg—Bi-based compounds are difficult to melt during the brazing temperature rising process, Bi is difficult to concentrate uniformly on the material surface, and the generation of coarse compounds reduces the generation of fine Mg—Bi compounds of less than 5.0 μm. Therefore, the number thereof needs to be lower than a predetermined value.

The number of particles of the Mg—Bi-based compounds on the surface of the brazing material is obtained by the fully automatic particle analysis by FE-EPMA described above. As means for suppressing the generation of coarse Mg—Bi-based compounds, adjustment can be achieved by appropriately controlling the above-mentioned casting conditions and hot rolling conditions.

For example, adjustment can be achieved by appropriately combining, during casting, performing the casing at a high cooling rate from a high molten metal temperature (coarse crystallization of the Mg—Bi compounds is suppressed), during hot rolling, taking a large total reduction rate of a certain level or more (refinement is achieved by promoting crushing of crystallized products), reducing a hot rolling finish temperature and increasing the subsequent cooling rate (coarse precipitation due to slow cooling is suppressed), and the like.

Cathode Current Density of Brazing Material Layer after Brazing is 0.1 mA/cm² or Less Since the brazing material contains Si, Fe, Mn, Mg, Bi, and the like, Si particles, Al—Fe intermetallic compounds, Al—Fe—Si intermetallic compounds, Al—Mn—Fe intermetallic compounds, Al—Mn—Fe—Si intermetallic compounds, Mg—Bi compounds, Bi compounds, and the like are present. These presence states (size, distribution density, and the like) act in a complex manner to determine the corrosion acceleration of a clad fin. These effects act in a complex manner and cannot be determined uniformly. However, the sum of these effects determines the cathode current density of the material, and this decreases, the corrosion acceleration decreases. That is, the cathode current density means the sum of the corrosion acceleration in the brazing material layer.

The cathode current density can be reduced to a predetermined value or less by controlling the kinds of elements added to the brazing material and the addition amounts thereof. Therefore, the cathode current density is set to be in the above range.

For the same reason, the cathode current density is more preferably 0.08 mA/cm² or less. For example, by reducing the amount of Fe added to the brazing material, the amounts of the Al—Fe intermetallic compounds and Al—Fe—Si intermetallic compounds present decrease, so that the cathode current density decreases. Furthermore, by setting the amounts of Mg and Bi added to be in predetermined ranges, coarse Bi particles present in the brazing material layer after brazing can be reduced, so that the cathode current density decreases.

<Core Material>

Mn: 0.8% to 1.8%

Mn is added to improve the material strength by precipitating as an intermetallic compound such as Al—Mn, Al—Mn—Si, Al—Mn—Fe, and Al—Mn—Si—Fe. When the Mn content is less than the lower limit, the effect is insufficient. When the Mn content exceeds the upper limit, a huge intennetallic compound (crystallized product) is formed during the casting and the rollability decreases.

For the same reason, it is desirable that the lower limit thereof is set to 0.9% and the upper limit thereof is set to 1.75%.

Si: 0.01% to 1.0%

Si is added to improve the material strength by being dissolved as a solid solution and also improve the material strength by precipitating as Mg2Si or Al—Mn—Si and Al—Mn—Si—Fe intermetallic compounds. When the Si content is less than the lower limit, the effect is insufficient. When the Si content exceeds the upper limit, the melting point of the material decreases. For the same reason, it is desirable that the lower limit thereof is set to 0.05% and the upper limit thereof is set to 0.8%.

Fe: 0.1% to 0.5%

Fe is added to improve the material strength by precipitating as an intermetallic compound such as Al—Mn—Fe and Al—Mn—Si—Fe. When the Fe content is less than the lower limit, the effect is insufficient. When the Fe content exceeds the upper limit, a huge intermetallic compound (crystallized product) is formed during the casting and the rollability decreases.

For the same reason, it is desirable that the lower limit thereof is set to 0.12% and the upper limit thereof is set to 0.4%.

Cu: 0.005% to 0.3%

Cu is added as desired to improve the material strength by being dissolved as a solid solution. When the Cu content is less than the lower limit, the effect is insufficient. When the Cu content exceeds the upper limit, the corrosion resistance decreases.

For the same reason, it is desirable that the lower limit thereof is set to 0.01% and the upper limit thereof is set to 0.2%. In a case where Cu is not positively contained, Cu may be contained as an inevitable impurity, for example, in 0.003% or less.

Mg: 0.1% to 0.7%

Mg improves the material strength by precipitating as compounds with Si and the like, and improves joinability by diffusing on the surface of the brazing material and reducing and decomposing the oxide film ($Al_2O_3$), so that Mg is added as desired. When the Mg content is less than the lower limit, the effect is insufficient. When the Mg content exceeds the upper limit, the material becomes too hard, making it difficult to manufacture the material.

For the same reason, it is desirable that the lower limit thereof is set to 0.2% and the upper limit thereof is set to 0.65%.

In a case where Mg is not positively contained, Mg may be contained as an inevitable impurity, for example, in 0.05% or less.

Zn: 0.2% to 1.6%

Zn is added to reduce the natural potential of a clad fin material and to cause other parts to undergo sacrificial corrosion. When the Zn content is less than the lower limit, the effect is insufficient. When the Zn content exceeds the upper limit, the potential becomes too low, and the corrosion resistance of the clad fin itself decreases.

For the same reason, it is desirable that the lower limit thereof is set to 0.3% and the upper limit thereof is set to 1.3%.

In a case where Zn is not positively added, Zn may be contained as an inevitable impurity in 0.1% or less.

Mg Concentration on Surface of Brazing Material at Braze Melting Temperature Is 0.15% to 1.0%

In flux-free brazing, by using an Al—Si—Mg brazing material, Mg in the brazing material that has been melted and activated reduces and decomposes an Al oxide film ($Al_2O_3$) on the surface of a joint, whereby joining is achieved. That is, in flux-free brazing for a joint shape with an open portion, by using the Al—Si—Mg brazing material, Mg in the brazing material that has been melted and activated reduces and decomposes an Al oxide film ($Al_2O_3$) on the surface of the joint, whereby joining is achieved. On the other hand, when Mg reacts with oxygen in an environment, a strong MgO film is generated and the brazability is reduced.

Therefore, in order to achieve stable joining in flux-free brazing, it is important to suppress oxidation by causing Mg not to be present on the material surface (that is, the surface of the brazing material) more than necessary until the braze melting temperature is reached, and to reduce and decompose the Al oxide film by causing Mg to be present on the material surface (that is, the surface of the brazing material) at the braze melting temperature in a predetermined amount or more.

In a clad material, Mg diffuses into each layer. Specifically, even if Mg is added only to the brazing material, Mg diffuses in a direction toward the core material, and in a case where the amount of Mg remaining on the surface of the brazing material during braze melting is a predetermined value or lower, the flux joinability decreases. That is, in the clad material, in addition to the initial amount of Mg added, the amount of Mg on the surface of the brazing material at the braze melting temperature is important. By causing the amount of Mg to be in a predetermined range, the reduction and decomposition of the Al oxide film can be achieved while suppressing oxidation. In a case where the Mg concentration is less than 0.15%, the amount of Mg necessary for the decomposition and reduction is insufficient, and the brazability is reduced. On the other hand, in a case where the Mg concentration exceeds 1.0%, a strong MgO film is generated by oxidation, and the brazability is also reduced.

For the same reason, it is desirable that the lower limit thereof is set to 0.17% and the upper limit thereof is set to 0.85%.

The braze melting temperature varies depending on the components of the material. For this reason, the temperature subtracted by 10° C. from the solidus temperature is treated as a braze melting temperature.

That is, according to the present invention, stable brazing is possible in the flux-free brazing, and after brazing, an effect of exhibiting high strength and excellent corrosion resistance can be obtained.

DETAILED DESCRIPTION OF THE INVENTION

Hereinafter, an embodiment of the present invention will be described.

An aluminum alloy is melted to be adjusted to the composition of the present invention. The melting can be performed by a semi-continuous casting method.

In the present embodiment, in order to disperse a fine Mg—Bi compound at the time before brazing, Mg and Bi are dissolved in an ingot as a solid solution by performing casing at a high cooling rate from a high molten metal temperature during casting of a brazing material. Specifically, the solid solubility of Mg and Bi can be increased by setting the molten metal temperature to 700° C. or higher.

The obtained aluminum alloy ingot is subjected to a homogenization treatment under predetermined conditions. When the homogenization treatment temperature is low, a coarse Mg—Bi compound is precipitated and it is difficult to obtain the distributed state of the Mg—Bi compound of the present invention at the time before the brazing. Therefore, it is desirable to perform the treatment at a treatment temperature of 400° C. or higher for 1 to 10 hours.

Next, the brazing material is assembled with a core material and the like and is subjected to hot clad rolling. At this time, in the present invention, the Mg—Bi compound is adjusted to a predetermined size and number density by controlling a rolling time at a predetermined temperature during hot rolling, an equivalent strain from the start to the end of the hot rolling, a hot rolling finish temperature, and a cooling rate after the hot rolling.

First, by satisfying the rolling time in a predetermined temperature range during the hot rolling, precipitation of the Mg—Bi compound having a predetermined size defined in the present invention is promoted in an environment where dynamic strain is applied. Specifically, the precipitation of the fine Mg—Bi compound is promoted by setting the rolling time during which the material temperature during the hot rolling is between 400° C. and 500° C. to 10 minutes or more.

Furthermore, by controlling the equivalent strain from the start to the end of the hot rolling, a coarse Mg—Bi crystallized product generated during the casting can be crushed and refined, and the number density thereof can be increased. Specifically, the Mg—Bi crystallized product is sufficiently refined by adjusting a slab thickness and a finish thickness so that the equivalent strains represented by Formula (1) satisfies $\varepsilon > 5.0$, thereby increasing the number density $$\varepsilon = (2/\sqrt{3})\ln(t_0/t) \quad \text{Formula (1)}$$

$t_0$: Hot rolling start thickness (slab thickness)
$t$: Hot rolling finish thickness Furthermore, when the hot rolling finish temperature is high and a state without dynamic strain is maintained, or when the cooling rate after the hot rolling is slow, a coarser Mg—Bi compound than desired by the present invention is precipitated at grain boundaries and the like. Therefore, by securing a cooling rate of a certain level or more by reducing the hot rolling finish temperature to a predetermined temperature, the precipitation of a coarse Mg—Bi compound is suppressed. Specifically, the precipitation of a coarse Mg—Bi compound is suppressed by setting the hot rolling finish temperature to 250° C. to 350° C. and controlling the cooling rate from the finish temperature to 200° C. to be faster than −20° C./hr.

Thereafter, a brazing sheet of the present invention is obtained through cold rolling or the like.

In the cold rolling, for example, cold rolling can be performed with a total reduction rate of 75% or more, process annealing can be performed at a temperature of 200° C. to 450° C., and then final rolling with a reduction rate of 40% can be performed. In cold rolling, the Mg—Bi compound is less likely to be crushed and does not deviate from the size and number density targeted by the present invention, so that the conditions are not particularly limited. Further, process annealing may not be performed, or H2n grade that has been finished by final annealing may be applied.

Figure 1:
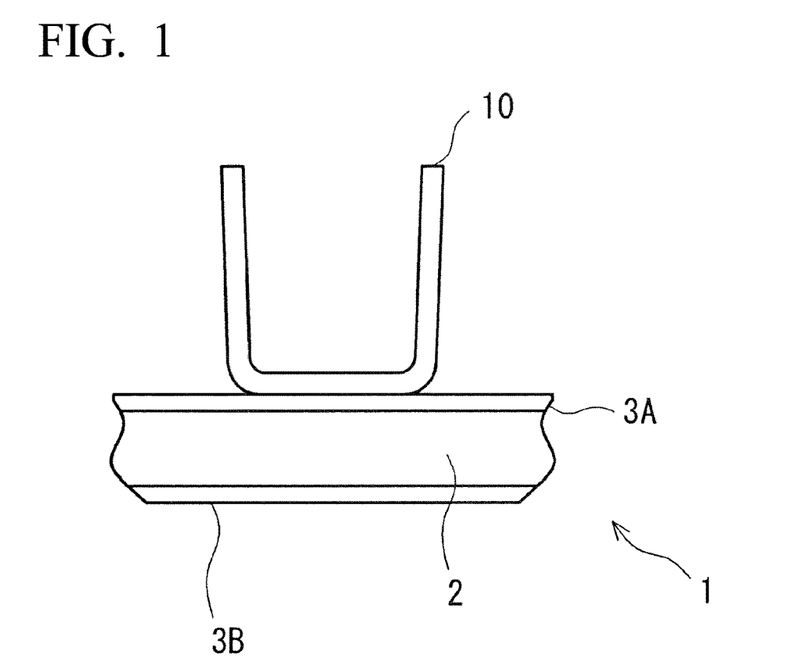
FIG. 1 is a view illustrating a brazing sheet for flux-free brazing according to an embodiment of the present invention.

In an aluminum alloy clad material 1 made of the brazing sheet obtained in the above process, an aluminum alloy brazing material 3A is disposed on one surface of an aluminum alloy core material 2, and an aluminum alloy brazing material 3B is disposed on the other surface of the aluminum alloy core material 2. The aluminum alloy clad material 1 is subjected to brazing as an assembly combined with other constituent members 10 (fin, tube, side plate, and the like) as the constituent members of the heat exchanger. The aluminum alloy brazing materials 3A and 3B may have the same composition, or may have different compositions. Furthermore, the thicknesses thereof may be the same or different.

The assembly is disposed in a heating furnace having a non-oxidizing atmosphere under a normal pressure. A non-oxidizing gas can be constituted using an inert gas such as nitrogen gas, argon, a reducing gas such as hydrogen or ammonia, or a mixed gas thereof. Although the pressure of the atmosphere in a brazing furnace is basically the normal pressure, for example, in order to improve a gas replacement efficiency inside a product, a medium to low vacuum of about 100 kPa to 0.1 Pa in a temperature range before melting the brazing material may be employed, or a positive pressure of 5 to 100 Pa from the atmospheric pressure may be employed in order to suppress the infiltration of outside air (atmosphere) into the furnace.

The heating furnace does not need to have a sealed space, and may be a tunnel type having a carry-in port and a carry-out port for the brazing material. Even in such a heating furnace, non-oxidizing properties are maintained by continuously blowing the inert gas into the furnace. The non-oxidizing atmosphere desirably has an oxygen concentration of 50 ppm or less by volume ratio.

In the above atmosphere, for example, heating is performed at a temperature rising rate of 10 to 200° C./min, and braze joining is performed under heat treatment conditions in which an attainment temperature of the assembly is 559° C. to 630° C.

Under the brazing conditions, the brazing time is shortened as the temperature rising rate is increased, so that the growth of an oxide film on a material surface is suppressed and the brazability is improved. Brazing is possible when the attainment temperature is equal to or higher than at least the solidus temperature of the brazing material. However, the brazing material which flows increases in amount as the temperature approaches the liquidus temperature, and a good joined state is easily obtained at a joint having an open portion. However, when the temperature is too high, brazing erosion tends to proceed, and the structural dimensional accuracy of the assembly after brazing decreases, which is not preferable.

Figure 2:
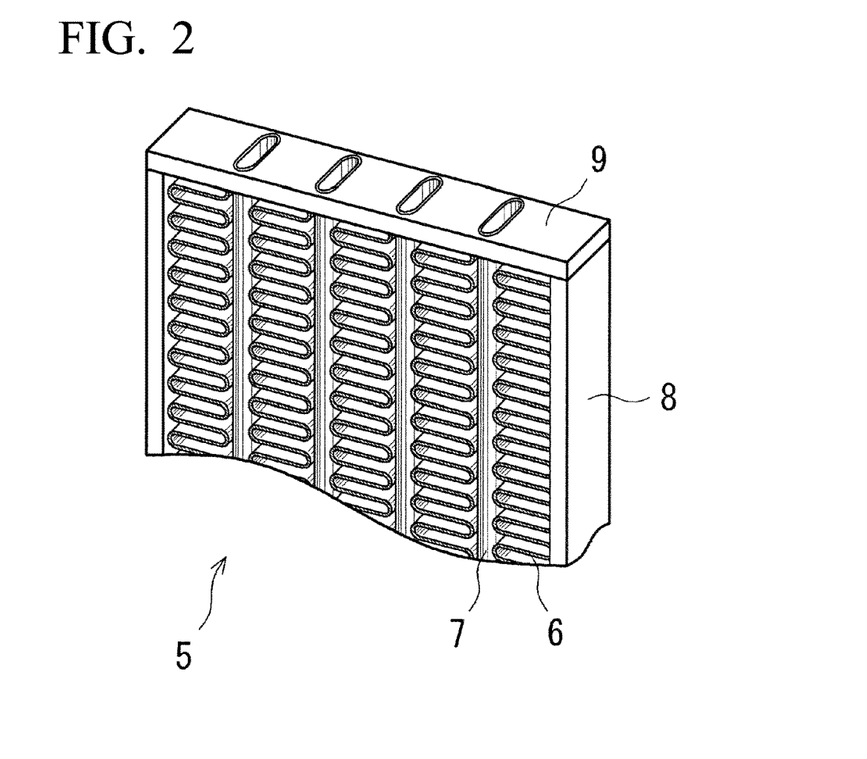
FIG. 2 is a perspective view illustrating an aluminum heat exchanger for a vehicle according to the embodiment of the present invention.

FIG. 2 illustrates an aluminum heat exchanger 5 in which fins 6 are formed using the aluminum alloy clad material 1 and a tube 7 made of an aluminum alloy is used as a brazing target material. The fin 6 and the tube 7 are assembled with a reinforcing member 8 and a header plate 9 to obtain the aluminum heat exchanger 5 for a vehicle or the like by flux-free brazing.

Example 1

Various brazing sheets having the compositions shown in Tables 1 and 2 or Tables 4 and 5 (balance consisting of Al and inevitable impurities) were produced into hot rolled sheets under the casting conditions, homogenization conditions (brazing material), and hot rolling conditions shown in Table 7. In addition, "–" in the component indicates that the content is 0 or the amount as an inevitable impurity. Thereafter, cold rolled sheets having a thickness of 0.06 mm and having an H14 equivalent grade were produced by cold rolling including process annealing. The clad ratio of the brazing material was 8% for both surfaces. Moreover, as a brazing target member, an aluminum bare material (0.3 mm thickness) of A3003 alloy and H14 was prepared.

The aluminum clad fin material was subjected to corrugating, and the corrugated fin and A3003 were combined to form cores having a 15-stage tube and a length of 300 mm as brazing evaluation models. The core was heated to 600° C. and held for 5 minutes in a brazing furnace in a nitrogen atmosphere (oxygen content 30 ppm), and the brazed state was evaluated. Here, a heat input amount from room temperature to 550° C. (the integral of the product of the diffusion coefficient of Zn and time during a brazing heat treatment) was set to $6 \times 10^{-11}$ $m^2$, a heat input amount until the completion of the brazing was set to $8 \times 10^{-10}$ $m^2$, and cooling from a brazing temperature of 600° C. to room temperature was performed at a cooling rate of 100° C./min.

A cathode current density after brazing is affected by an element diffusion state after brazing. The element diffusion state is determined by the heat input amount if the material specifications (added components before brazing and amounts thereof) are determined. Therefore, by specifying the heat input amount, the cathode current density of the clad material before brazing can be evaluated. The heat input amount is a parameter indicating the ease of element diffusion, and herein, is expressed as the integration of the product of the diffusion coefficient of Zn and time. The diffusion coefficient is obtained by the following formula.

Diffusion coefficient=frequency factor×EXP (−activation energy/(gas constant×temperature expressed in absolute temperature))

Frequency factor: $1.77 \times 10^{-5}$ ($m^2$/s)
Activation energy: 118 (kJ/mol)

Regarding the completion of the brazing, the completion of the brazing is set to the time when the temperature reaches room temperature after a heating treatment.

Moreover, brazing conditions including the heat input amount are not limited to the above conditions, and the above conditions can be used as measurement conditions for the clad material before brazing.

For each specimen in examples, the following evaluation was performed and shown in Tables 3 and 6.

Brazability
Joint Ratio

A joint ratio was obtained by the following formula, and superiority and inferiority between samples were evaluated.

Fin joint ratio=(total brazing length of fin and tube/ total contact length of fin and tube)×100

Figure 3:
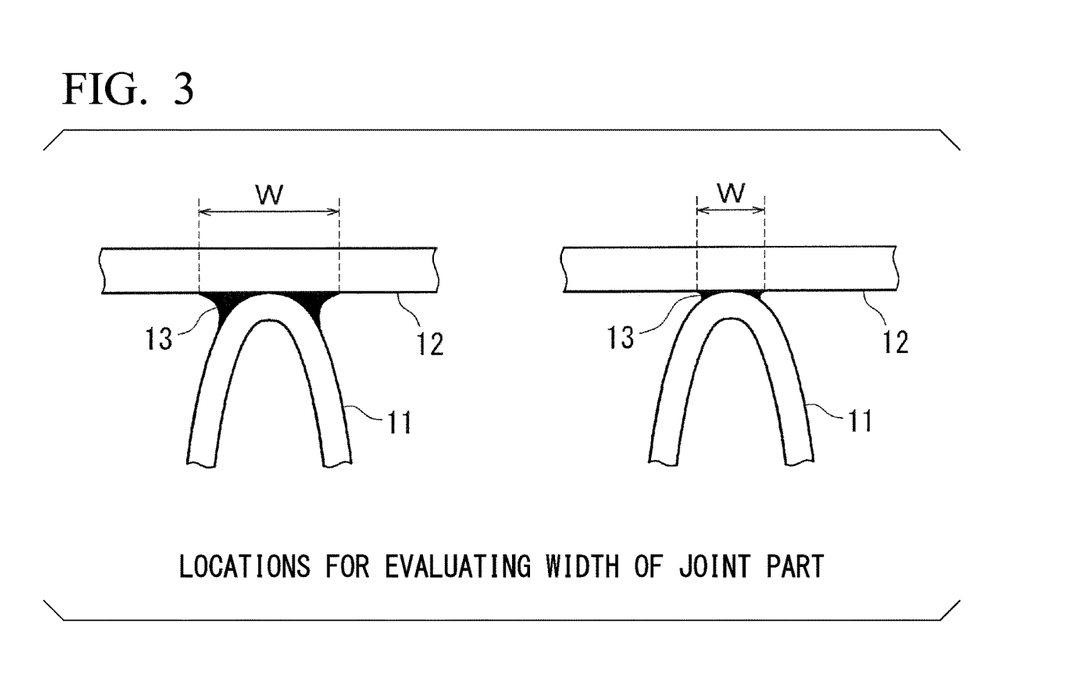
FIG. 3 is a view illustrating a brazing evaluation model in an example of the present invention.

Regarding the joint ratio, 90% or more was evaluated as O, and less than 90% was evaluated as X Fillet Length A sample cut out from the core was embedded in a resin and mirror-polished, and a fillet length at a joint 13 between a fin 11 and a tube 12 was measured using an optical microscope as shown in FIG. 3. The number of joints to be measured was 20 and the average thereof was taken as the fillet length to evaluate superiority or inferiority.

In the fillet length, 600 μm or more was evaluated as A, 500 μm or more and less than 600 μm as B, 400 μm or more and less than 500 μm as C, 300 μm or more and less than 400 μm as D, and less than 300 μm as E.

Coarse Primary Crystal Phase Si Particles

A produced brazing sheet was embedded in a resin, a cross section thereof parallel to a rolling direction was mirror-polished, and the structure thereof was revealed with Barker's solution and then observed with an optical microscope to evaluate the formation state of coarse primary phase Si in a brazing material layer. Observation was performed on a visual field of 300 μm at 10 points.

A case where coarse Si particles having an equivalent circle diameter of 30 μm or more were less than 2 in number was evaluated as A, a range from 2 to 9 was evaluated as B, and a case of 10 or more particles was evaluated as C.

Strength after Brazing

The brazing sheet was placed in a furnace in a drop form, and a brazing equivalent heat treatment was performed under the brazing conditions. Thereafter, the sample was cut out, a tensile test was conducted at room temperature by a normal method based on JIS, and a tensile strength was evaluated.

Regarding the strength after brazing, 160 MPa or more was evaluated as A, 150 MPa or more and less than 160 MPa as B, 140 MPa or more and less than 150 MPa as C, and less than 140 MPa as D.

Corrosion Resistance

The brazing sheet was placed in the furnace in a drop form, and the brazing equivalent heat treatment was performed under the brazing conditions. Thereafter, the sample was cut into a size of 30 mm×80 mm, and immersed in a SWAAT solution for 2 days. Corrosion products were removed from the sample after the corrosion test with chromic acid phosphate, and the corrosion weight loss was calculated from the weight before and after the corrosion test.

For corrosion weight loss, less than 5 mg/$cm^2$ was evaluated as A, 5 to 8 mg/$cm^2$ or less as B, 8 to 10 mg/$cm^2$ or less as less as C, and more than 10 mg/$cm^2$ as D.

Sacrificial Anode Effect

Regarding the sacrificial anode effect, the surfaces other than the sacrificial material surface were masked and then subjected to SWAAT for 40 days. Corrosion products were removed from the sample after the corrosion test with chromic acid phosphate, and the corrosion depth was measured by observing the cross section of a maximum corrosion portion.

Regarding the corrosion depth, within half of the sheet thickness was evaluated as A, not penetrated although exceeding half the sheet thickness as B, and penetrated as C.

Cathode Current Density

The cathode current density was obtained by cutting a sample for polarization measurement from the material subjected to the brazing equivalent heat treatment under the above brazing conditions. After masking surfaces other than the measurement surface, the sample was immersed in a 30% $HNO_3$ solution at room temperature for 5 seconds, washed with tap water or ion-exchange water, and then subjected to cathode polarization measurement as it was without being dried, under air release conditions in a 5% NaCl aqueous solution adjusted to a pH of 3 at room temperature. By setting a potential sweep rate to 0.5 mV/s, the voltage was swept to −1200 mV, and the current density at −1000 mV was defined as the cathode current density.

Mg Concentration of Surface of Brazing Material at Braze Melting Temperature The brazing equivalent heat treatment was performed under the above brazing conditions, the sample was taken out from the furnace at the moment when the braze melting temperature (a solidus temperature was calculated from the components using the phase diagram calculation software JMatPro, and a temperature subtracted by 10° C. from the solidus temperature) was reached, the sample was embedded in a resin and mirror-polished, and the Mg concentration on the surface of the brazing material was measured by EPMA analysis in a cross-sectional direction. In the measured EPMA data, the average Mg concentration in a range of 5 μm from the surface of the brazing material was taken as the Mg concentration on the surface of the brazing material.

Since the braze melting temperature varies depending on the components of a material, the solidus temperature was obtained using the phase diagram calculation software (JMatPro; trademark), and the temperature subtracted by 10° C. from the solidus temperature was treated as the braze melting temperature.

TABLE 1

| | | Elements added to brazing material | | | | | | Mg—Bi compound [/10,000 μm$^2$] | | |
|---|---|---|---|---|---|---|---|---|---|---|
| | | [wt %] | | | | | Manufacturing | Less | 5 μm | (Bi + |
| Specimen No. | Mg | Si | Bi | Sr | Fe | Mn | method | than 5 μm | or more | Mg) × Sr |
| Example | 1 | 0.02 | 11.0 | 0.15 | 0.0005 | 0.12 | 0.07 | E | 24 | 0 | 0.000085 |
| | 2 | 0.03 | 11.0 | 0.15 | 0.0005 | 0.06 | 0.01 | E | 39 | 0 | 0.00009 |
| | 3 | 0.1 | 11.0 | 0.15 | 0.0005 | 0.12 | 0.07 | E | 41 | 0 | 0.000125 |
| | 4 | 0.6 | 11.0 | 0.15 | 0.0005 | 0.12 | 0.07 | F | 35 | 0 | 0.000375 |
| | 5 | 0.8 | 11.0 | 0.23 | 0.007 | 0.12 | 0.07 | H | 44 | 0 | 0.00721 |
| | 6 | 1.2 | 11.0 | 0.20 | 0.007 | 0.09 | 0.04 | H | 48 | 0 | 0.0098 |
| | 7 | 1.5 | 11.0 | 0.20 | 0.007 | 0.06 | 0.01 | H | 55 | 0 | 0.0119 |
| | 8 | 0.5 | 6.0 | 0.23 | 0.008 | 0.12 | 0.07 | I | 54 | 0 | 0.00584 |
| | 9 | 0.3 | 6.5 | 0.20 | 0.007 | 0.15 | 0.1 | B | 34 | 0 | 0.0035 |
| | 10 | 0.3 | 13.0 | 0.10 | 0.005 | 0.12 | 0.07 | E | 38 | 0 | 0.002 |
| | 11 | 0.5 | 14.0 | 0.20 | 0.005 | 0.12 | 0.3 | G | 55 | 1 | 0.0035 |
| | 12 | 0.3 | 11.0 | 0.05 | 0.005 | 0.12 | 0.2 | I | 32 | 0 | 0.00175 |
| | 13 | 0.5 | 11.0 | 0.08 | 0.008 | 0.12 | 0.07 | F | 33 | 0 | 0.00464 |
| | 14 | 0.5 | 12.0 | 0.23 | 0.006 | 0.15 | 0.1 | A | 40 | 0 | 0.00438 |
| | 15 | 0.5 | 11.0 | 0.25 | 0.006 | 0.15 | 0.1 | B | 46 | 0 | 0.0045 |
| | 16 | 0.5 | 10.0 | 0.15 | 0.0001 | 0.15 | 0.1 | E | 38 | 0 | 0.000065 |
| | 17 | 0.5 | 11.0 | 0.15 | 0.0005 | 0.15 | 0.1 | F | 31 | 0 | 0.000325 |
| | 18 | 0.2 | 10.0 | 0.15 | 0.06 | 0.12 | 0.07 | I | 33 | 0 | 0.021 |
| | 19 | 0.05 | 10.0 | 0.15 | 0.09 | 0.12 | 0.07 | E | 24 | 0 | 0.018 |
| | 20 | 0.1 | 10.0 | 0.15 | 0.1 | 0.12 | 0.07 | E | 35 | 0 | 0.025 |
| | 21 | 1.2 | 11.0 | 0.20 | 0.07 | 0.07 | 0.02 | H | 49 | 0 | 0.098 |
| | 22 | 1.2 | 11.0 | 0.20 | 0.05 | 0.12 | 0.07 | H | 49 | 0 | 0.07 |
| | 23 | 0.5 | 11.0 | 0.15 | 0.0005 | 0.05 | 0.1 | E | 38 | 0 | 0.000325 |
| | 24 | 0.5 | 11.0 | 0.15 | 0.0005 | 0.10 | 0.1 | E | 38 | 0 | 0.000325 |
| | 25 | 0.5 | 11.0 | 0.15 | 0.0005 | 0.20 | 0.1 | E | 38 | 0 | 0.000325 |
| | 26 | 0.5 | 11.0 | 0.15 | 0.0005 | 0.30 | 0.2 | E | 38 | 0 | 0.000325 |
| | 27 | 0.5 | 11.0 | 0.15 | 0.008 | 0.12 | 0.07 | E | 37 | 0 | 0.0052 |
| | 28 | 0.5 | 9.5 | 0.20 | 0.006 | 0.12 | 0.07 | A | 38 | 0 | 0.0042 |
| | 29 | 0.5 | 10.0 | 0.20 | 0.007 | 0.12 | 0.07 | D | 43 | 0 | 0.0049 |
| | 30 | 0.5 | 10.0 | 0.20 | 0.008 | 0.12 | 0.07 | B | 33 | 0 | 0.0056 |
| | 31 | 0.5 | 6.0 | 0.23 | 0.008 | 0.12 | 0.07 | I | 54 | 0 | 0.00584 |
| | 32 | 0.3 | 6.5 | 0.20 | 0.007 | 0.15 | 0.1 | B | 34 | 0 | 0.0035 |
| | 33 | 0.3 | 13.0 | 0.10 | 0.005 | 0.12 | 0.07 | E | 38 | 0 | 0.002 |
| | 34 | 0.5 | 14.0 | 0.20 | 0.005 | 0.06 | 0.01 | G | 55 | 1 | 0.0035 |
| | 35 | 0.3 | 11.0 | 0.05 | 0.005 | 0.12 | 0.07 | I | 32 | 0 | 0.00175 |
| | 36 | 0.5 | 10.0 | 0.20 | 0.01 | 0.12 | 0.07 | F | 47 | 0 | 0.007 |
| | 37 | 0.5 | 11.0 | 0.20 | 0.01 | 0.17 | 0.12 | B | 33 | 0 | 0.007 |
| | 38 | 0.5 | 9.5 | 0.20 | 0.009 | 0.12 | 0.07 | J | 66 | 1 | 0.0063 |
| | 39 | 0.3 | 11.0 | 0.20 | 0.01 | 0.12 | 0.07 | A | 41 | 0 | 0.005 |
| | 40 | 0.3 | 9.5 | 0.20 | 0.01 | 0.12 | 0.07 | B | 36 | 0 | 0.005 |
| | 41 | 0.3 | 11.0 | 0.20 | 0.004 | 0.12 | 0.07 | I | 55 | 0 | 0.002 |
| | 42 | 0.3 | 8.0 | 0.15 | 0.007 | 0.12 | 0.07 | E | 41 | 0 | 0.00315 |
| | 43 | 0.3 | 11.0 | 0.15 | 0.005 | 0.12 | 0.07 | G | 33 | 0 | 0.00225 |

TABLE 1-continued

| | Elements added to brazing material [wt %] | | | | | | Manufacturing method | Mg—Bi compound [/10,000 μm²] | | (Bi + Mg) × Sr |
|---|---|---|---|---|---|---|---|---|---|---|
| Specimen No. | Mg | Si | Bi | Sr | Fe | Mn | | Less than 5 μm | 5 μm or more | |
| 44 | 0.3 | 11.5 | 0.15 | 0.01 | 0.12 | 0.07 | J | 47 | 0 | 0.0045 |
| 45 | 0.5 | 11.0 | 0.15 | 0.01 | 0.17 | 0.12 | I | 35 | 0 | 0.0065 |
| 46 | 0.5 | 8.0 | 0.20 | 0.01 | 0.12 | 0.07 | C | 38 | 0 | 0.007 |
| 47 | 0.5 | 11.0 | 0.20 | 0.01 | 0.12 | 0.07 | C | 38 | 0 | 0.007 |
| 48 | 0.3 | 8.8 | 0.20 | 0.01 | 0.12 | 0.07 | B | 36 | 0 | 0.005 |
| 49 | 0.5 | 11.0 | 0.15 | 0.008 | 0.12 | 0.07 | E | 37 | 0 | 0.0052 |
| 50 | 0.5 | 9.5 | 0.20 | 0.006 | 0.12 | 0.07 | A | 38 | 0 | 0.0042 |
| 51 | 0.5 | 10.0 | 0.20 | 0.007 | 0.12 | 0.07 | D | 43 | 0 | 0.0049 |
| 52 | 0.3 | 13.0 | 0.10 | 0.005 | 0.12 | 0.07 | E | 38 | 0 | 0.002 |
| 53 | 0.5 | 14.0 | 0.20 | 0.005 | 0.12 | 0.07 | G | 55 | 1 | 0.0035 |
| 54 | 0.3 | 11.0 | 0.20 | 0.004 | 0.12 | 0.07 | I | 55 | 0 | 0.002 |
| 55 | 0.3 | 11.0 | 0.15 | 0.007 | 0.12 | 0.07 | E | 41 | 0 | 0.00315 |
| 56 | 0.3 | 10.0 | 0.15 | 0.005 | 0.12 | 0.07 | G | 33 | 0 | 0.00225 |
| 57 | 0.5 | 11.0 | 0.20 | 0.008 | 0.17 | 0.12 | D | 44 | 0 | 0.0056 |
| 58 | 0.5 | 8.5 | 0.15 | 0.01 | 0.12 | 0.07 | I | 38 | 0 | 0.0065 |
| 59 | 0.5 | 11.0 | 0.15 | 0.009 | 0.12 | 0.07 | J | 42 | 0 | 0.00585 |
| 60 | 0.5 | 9.2 | 0.20 | 0.01 | 0.12 | 0.07 | H | 43 | 0 | 0.007 |
| 61 | 0.5 | 11.0 | 0.20 | 0.006 | 0.12 | 0.07 | A | 41 | 0 | 0.0042 |
| 62 | 0.5 | 9.0 | 0.20 | 0.0002 | 0.12 | 0.07 | J | 66 | 1 | 0.00014 |
| 63 | 0.5 | 11.0 | 0.23 | 0.01 | 0.12 | 0.07 | B | 47 | 0 | 0.0073 |
| 64 | 0.5 | 8.0 | 0.12 | 0.01 | 0.09 | 0.04 | F | 33 | 0 | 0.0062 |
| 65 | 0.5 | 11.0 | 0.20 | 0.008 | 0.12 | 0.07 | B | 34 | 0 | 0.0056 |
| 66 | 0.5 | 11.0 | 0.15 | 0.01 | 0.12 | 0.07 | G | 36 | 0 | 0.0065 |
| 67 | 0.3 | 11.0 | 0.20 | 0.02 | 0.12 | 0.07 | E | 35 | 0 | 0.01 |
| 68 | 0.5 | 11.0 | 0.15 | 0.0005 | 0.15 | 0.1 | F | 31 | 0 | 0.000325 |
| 69 | 0.5 | 9.5 | 0.15 | 0.0005 | 0.25 | 0.2 | F | 31 | 0 | 0.000325 |
| 70 | 1.0 | 8.0 | 0.12 | 0.0005 | 0.10 | 0.05 | F | 31 | 0 | 0.00056 |
| 71 | 1.2 | 13.0 | 0.15 | 0.0005 | 0.07 | 0.02 | F | 31 | 0 | 0.000675 |
| 72 | 0.3 | 11.0 | 0.23 | 0.0005 | 0.10 | 0.05 | F | 31 | 0 | 0.000265 |

TABLE 2

| | Specimen No. | Core material composition [wt %] | | | | | |
|---|---|---|---|---|---|---|---|
| | | Si | Mg | Mn | Cu | Fe | Zn |
| Example | 1 | 0.7 | 0.3 | 1.2 | 0.01 | 0.2 | 0.9 |
| | 2 | 0.7 | 0.3 | 1.2 | 0.01 | 0.2 | 0.9 |
| | 3 | 0.7 | 0.3 | 1.2 | 0.05 | 0.2 | 0.7 |
| | 4 | 0.7 | 0.3 | 1.5 | 0.05 | 0.2 | 0.6 |
| | 5 | 0.7 | 0.3 | 1.5 | — | 0.2 | 0.6 |
| | 6 | 0.7 | 0.3 | 1.5 | — | 0.2 | 0.6 |
| | 7 | 0.7 | 0.3 | 1.5 | — | 0.2 | 0.6 |
| | 8 | 0.04 | 0.5 | 1.5 | 0.02 | 0.2 | 0.9 |
| | 9 | 0.1 | 0.5 | 1.5 | 0.05 | 0.2 | 0.9 |
| | 10 | 0.1 | 0.5 | 1.5 | 0.05 | 0.2 | 0.7 |
| | 11 | 0.07 | 0.5 | 1.5 | 0.05 | 0.2 | 0.7 |
| | 12 | 0.7 | 0.5 | 1.2 | 0.005 | 0.2 | 0.9 |
| | 13 | 0.7 | 0.5 | 1.2 | 0.05 | 0.2 | 0.9 |
| | 14 | 0.7 | 0.5 | 1.2 | 0.01 | 0.2 | 0.9 |
| | 15 | 0.7 | 0.5 | 1.2 | 0.03 | 0.2 | 0.9 |
| | 16 | 0.7 | 0.5 | 1.2 | 0.05 | 0.2 | 1.1 |
| | 17 | 0.05 | 0.5 | 1.5 | 0.05 | 0.2 | 0.9 |
| | 18 | 0.7 | 0.5 | 1.5 | 0.01 | 0.2 | 1.2 |
| | 19 | 0.7 | 0.5 | 1.5 | 0.05 | 0.2 | 0.9 |
| | 20 | 0.7 | 0.5 | 1.5 | 0.05 | 0.2 | 0.9 |
| | 21 | 0.7 | 0.5 | 1.5 | 0.05 | 0.2 | 0.9 |
| | 22 | 0.7 | 0.5 | 1.5 | 0.05 | 0.2 | 0.9 |
| | 23 | 0.7 | 0.5 | 1.2 | 0.05 | 0.2 | 1.1 |
| | 24 | 0.7 | 0.5 | 1.2 | 0.05 | 0.2 | 1.1 |
| | 25 | 0.7 | 0.5 | 1.2 | 0.05 | 0.2 | 1.1 |
| | 26 | 0.7 | 0.5 | 1.2 | 0.05 | 0.2 | 1.1 |
| | 27 | 0.01 | 0.5 | 1.2 | 0.05 | 0.2 | 0.7 |
| | 28 | 0.05 | 0.5 | 1.2 | 0.05 | 0.2 | 0.7 |
| | 29 | 0.8 | 0.5 | 1.2 | 0.05 | 0.2 | 0.5 |
| | 30 | 1.0 | 0.5 | 1.2 | 0.04 | 0.2 | 0.5 |
| | 31 | 0.04 | — | 1.5 | 0.02 | 0.2 | 0.9 |
| | 32 | 0.1 | 0.01 | 1.5 | 0.05 | 0.2 | 0.9 |
| | 33 | 0.1 | 0.02 | 1.5 | 0.05 | 0.2 | 0.7 |
| | 34 | 0.07 | — | 1.5 | 0.05 | 0.2 | 0.7 |
| | 35 | 0.7 | 0.04 | 1.2 | 0.005 | 0.2 | 0.9 |
| | 36 | 0.75 | 0.1 | 1.2 | 0.05 | 0.2 | 0.9 |
| | 37 | 0.75 | 0.2 | 1.2 | 0.008 | 0.2 | 0.9 |
| | 38 | 0.75 | 0.65 | 1.2 | 0.05 | 0.2 | 0.9 |
| | 39 | 0.75 | 0.7 | 1.2 | 0.05 | 0.2 | 0.9 |
| | 40 | 0.7 | 0.5 | 0.8 | 0.05 | 0.2 | 0.6 |
| | 41 | 0.7 | 0.5 | 1.0 | 0.05 | 0.2 | 0.7 |
| | 42 | 0.7 | 0.5 | 1.7 | 0.05 | 0.2 | 0.6 |
| | 43 | 0.7 | 0.5 | 1.8 | 0.05 | 0.2 | 0.6 |
| | 44 | 0.85 | 0.5 | 1.2 | 0.005 | 0.2 | 0.6 |
| | 45 | 0.85 | 0.5 | 1.2 | 0.01 | 0.2 | 1.3 |
| | 46 | 0.85 | 0.5 | 1.4 | 0.2 | 0.2 | 0.9 |
| | 47 | 0.2 | 0.5 | 1.2 | 0.3 | 0.2 | 0.9 |
| | 48 | 0.7 | 0.5 | 1.2 | 0.05 | 0.2 | — |
| | 49 | 0.02 | 0.5 | 1.2 | 0.05 | 0.2 | 0.01 |
| | 50 | 0.1 | 0.5 | 1.2 | 0.05 | 0.2 | 0 |
| | 51 | 0.8 | 0.5 | 1.2 | 0.05 | 0.2 | 0.02 |
| | 52 | 0.1 | 0.5 | 1.5 | 0.05 | 0.2 | — |
| | 53 | 0.07 | 0.5 | 1.5 | 0.05 | 0.2 | 0.05 |
| | 54 | 0.7 | 0.5 | 1.2 | 0.05 | 0.2 | 0.2 |
| | 55 | 0.4 | 0.5 | 1.4 | 0.05 | 0.2 | 1.3 |
| | 56 | 0.3 | 0.5 | 1.4 | 0.05 | 0.2 | 1.6 |
| | 57 | 0.5 | 0.5 | 1.2 | 0.02 | 0.1 | 0.9 |
| | 58 | 0.5 | 0.5 | 1.4 | 0.03 | 0.12 | 0.9 |
| | 59 | 0.5 | 0.5 | 1.4 | 0.05 | 0.4 | 0.9 |
| | 60 | 0.5 | 0.5 | 1.4 | 0.05 | 0.5 | 0.9 |
| | 61 | 0.2 | 0.5 | 1.4 | 0.05 | 0.2 | 0.7 |
| | 62 | 0.7 | 0.5 | 1.2 | 0.01 | 0.2 | 1.2 |
| | 63 | 0.7 | 0.5 | 1.3 | 0.05 | 0.2 | 0.6 |
| | 64 | 0.4 | 0.5 | 1.4 | 0.007 | 0.2 | 1.2 |
| | 65 | 0.07 | 0.5 | 1.5 | 0.05 | 0.2 | 0.9 |
| | 66 | 0.7 | 0.5 | 1.2 | 0.05 | 0.2 | 0.9 |
| | 67 | 0.7 | 0.2 | 1.4 | 0.05 | 0.2 | 0.5 |
| | 68 | 0.05 | 0.5 | 1.5 | 0.05 | 0.2 | 0.9 |

TABLE 2-continued

| | Core material composition [wt %] | | | | | |
|---|---|---|---|---|---|---|
| Specimen No. | Si | Mg | Mn | Cu | Fe | Zn |
| 69 | 0.05 | 0.5 | 1.5 | 0.05 | 0.2 | 0.9 |
| 70 | 0.05 | 0.5 | 1.5 | 0.05 | 0.2 | 0.9 |
| 71 | 0.05 | 0.5 | 1.5 | 0.05 | 0.2 | 0.9 |
| 72 | 0.05 | 0.5 | 1.5 | 0.05 | 0.2 | 0.9 |

TABLE 3

| | Specimen No. | Concentration of Mg on surface of brazing material (wt %) | Brazability | | | Corrosion resistance | | | Strength after brazing | |
|---|---|---|---|---|---|---|---|---|---|---|
| | | | Joint ratio | Fillet length | Coarse Si particles | Cathode current density | Corrosion weight loss | Sacrificial Anode Effect | [MPa] | Evaluation |
| Example | 1 | 0.14 | ○ | D | A | 0.06 | A | A | 148 | C |
| | 2 | 0.18 | ○ | C | A | 0.06 | A | A | 148 | C |
| | 3 | 0.25 | ○ | B | A | 0.08 | A | A | 148 | C |
| | 4 | 0.44 | ○ | A | A | 0.08 | A | A | 158 | B |
| | 5 | 0.54 | ○ | B | A | 0.08 | A | A | 160 | A |
| | 6 | 0.73 | ○ | C | A | 0.08 | A | A | 162 | A |
| | 7 | 0.86 | ○ | D | A | 0.08 | A | A | 165 | A |
| | 8 | 0.5 | ○ | C | A | 0.06 | A | A | 161 | A |
| | 9 | 0.4 | ○ | B | A | 0.06 | A | A | 160 | A |
| | 10 | 0.4 | ○ | B | A | 0.09 | B | A | 160 | A |
| | 11 | 0.5 | ○ | C | B | 0.1 | C | A | 162 | A |
| | 12 | 0.4 | ○ | C | A | 0.08 | A | A | 160 | A |
| | 13 | 0.5 | ○ | B | A | 0.08 | A | A | 162 | A |
| | 14 | 0.5 | ○ | A | A | 0.08 | A | A | 162 | A |
| | 15 | 0.5 | ○ | C | A | 0.08 | A | A | 161 | A |
| | 16 | 0.5 | ○ | A | B | 0.08 | A | A | 162 | A |
| | 17 | 0.5 | ○ | A | A | 0.08 | A | A | 161 | A |
| | 18 | 0.36 | ○ | B | A | 0.08 | B | A | 164 | A |
| | 19 | 0.07 | ○ | D | B | 0.08 | A | A | 163 | A |
| | 20 | 0.32 | ○ | B | B | 0.08 | A | A | 163 | A |
| | 21 | 0.84 | ○ | C | B | 0.08 | A | A | 174 | A |
| | 22 | 0.84 | ○ | C | A | 0.08 | A | A | 174 | A |
| | 23 | 0.5 | ○ | A | B | 0.04 | A | A | 149 | C |
| | 24 | 0.5 | ○ | A | B | 0.05 | A | A | 155 | B |
| | 25 | 0.5 | ○ | A | B | 0.08 | B | A | 162 | A |
| | 26 | 0.5 | ○ | A | B | 0.1 | C | A | 162 | A |
| | 27 | 0.5 | ○ | A | A | 0.08 | A | A | 157 | B |
| | 28 | 0.5 | ○ | A | A | 0.08 | A | A | 160 | A |
| | 29 | 0.5 | ○ | A | A | 0.08 | A | A | 163 | A |
| | 30 | 0.5 | ○ | C | A | 0.08 | A | A | 164 | A |
| | 31 | 0.24 | ○ | C | A | 0.06 | A | A | 161 | A |
| | 32 | 0.14 | ○ | C | A | 0.06 | A | A | 140 | C |
| | 33 | 0.14 | ○ | C | A | 0.09 | B | A | 141 | C |
| | 34 | 0.23 | ○ | C | B | 0.08 | B | A | 140 | C |
| | 35 | 0.15 | ○ | D | A | 0.08 | A | A | 160 | A |
| | 36 | 0.29 | ○ | A | A | 0.08 | A | A | 143 | C |
| | 37 | 0.34 | ○ | B | A | 0.08 | A | A | 148 | C |
| | 38 | 0.58 | ○ | A | A | 0.08 | A | A | 169 | A |
| | 39 | 0.48 | ○ | B | A | 0.08 | A | A | 170 | A |
| | 40 | 0.4 | ○ | B | A | 0.08 | A | A | 157 | B |
| | 41 | 0.4 | ○ | A | A | 0.08 | A | A | 160 | A |
| | 42 | 0.4 | ○ | B | A | 0.08 | A | A | 168 | A |
| | 43 | 0.4 | ○ | B | A | 0.08 | A | A | 169 | A |
| | 44 | 0.4 | ○ | A | A | 0.08 | A | A | 159 | B |
| | 45 | 0.5 | ○ | A | A | 0.08 | A | A | 161 | A |
| | 46 | 0.5 | ○ | A | A | 0.08 | A | A | 172 | A |
| | 47 | 0.5 | ○ | A | A | 0.08 | B | A | 168 | A |
| | 48 | 0.4 | ○ | B | A | 0.08 | A | B | 160 | A |
| | 49 | 0.5 | ○ | A | A | 0.08 | A | B | 156 | B |
| | 50 | 0.5 | ○ | A | A | 0.08 | A | B | 157 | B |
| | 51 | 0.5 | ○ | A | A | 0.08 | A | B | 163 | A |
| | 52 | 0.4 | ○ | B | A | 0.09 | A | B | 160 | A |
| | 53 | 0.5 | ○ | C | B | 0.1 | B | B | 162 | A |
| | 54 | 0.4 | ○ | A | A | 0.08 | A | A | 160 | A |
| | 55 | 0.4 | ○ | B | A | 0.08 | B | A | 161 | A |
| | 56 | 0.4 | ○ | B | A | 0.08 | C | A | 160 | A |

TABLE 3-continued

| Specimen No. | Concentration of Mg on surface of brazing material (wt %) | Brazability Joint ratio | Brazability Fillet length | Brazability Coarse Si particles | Corrosion resistance Cathode current density | Corrosion resistance Corrosion weight loss | Corrosion resistance Sacrificial Anode Effect | Strength after brazing [MPa] | Strength after brazing Evaluation |
|---|---|---|---|---|---|---|---|---|---|
| 57 | 0.5 | ○ | A | A | 0.08 | A | A | 159 | B |
| 58 | 0.5 | ○ | A | A | 0.08 | A | A | 163 | A |
| 59 | 0.5 | ○ | A | A | 0.08 | A | A | 165 | A |
| 60 | 0.5 | ○ | A | A | 0.08 | B | A | 166 | A |
| 61 | 0.5 | ○ | B | A | 0.08 | A | A | 161 | A |
| 62 | 0.5 | ○ | A | A | 0.08 | B | A | 162 | A |
| 63 | 0.5 | ○ | A | A | 0.08 | A | A | 163 | A |
| 64 | 0.5 | ○ | B | A | 0.08 | B | A | 163 | A |
| 65 | 0.5 | ○ | A | A | 0.08 | A | A | 162 | A |
| 66 | 0.5 | ○ | B | A | 0.08 | A | A | 162 | A |
| 67 | 0.25 | ○ | B | A | 0.08 | A | A | 149 | C |
| 68 | 0.5 | ○ | A | A | 0.08 | A | A | 161 | A |
| 69 | 0.5 | ○ | B | A | 0.08 | A | A | 161 | A |
| 70 | 0.74 | ○ | C | A | 0.08 | A | A | 166 | A |
| 71 | 0.83 | ○ | B | A | 0.08 | A | A | 168 | A |
| 72 | 0.41 | ○ | B | A | 0.08 | A | A | 160 | A |

TABLE 4

| | Specimen No. | Elements added to brazing material [wt %] Mg | Si | Bi | Sr | Fe | Mn | Manufacturing method | Mg—Bi compound [/10,000 μm²] Less than 5 μm | Mg—Bi compound [/10,000 μm²] 5 μm or more | (Bi + Mg) × Sr |
|---|---|---|---|---|---|---|---|---|---|---|---|
| Comparative Example | 1 | 0.01 | 11.0 | 0.11 | 0.0005 | 0.17 | 0.12 | B | 10 | 0 | 0.00006 |
| | 2 | 1.6 | 11.0 | 0.15 | 0.0005 | 0.06 | 0.01 | E | 32 | 0 | 0.000875 |
| | 3 | 0.5 | 5.5 | 0.23 | 0.01 | 0.17 | 0.12 | A | 42 | 0 | 0.0073 |
| | 4 | 0.3 | 14.5 | 0.20 | 0.008 | 0.11 | 0.06 | I | 55 | 1 | 0.004 |
| | 5 | 0.1 | 11.0 | 0.04 | 0.0005 | 0.17 | 0.12 | C | 15 | 0 | 0.00007 |
| | 6 | 0.5 | 8.0 | 0.28 | 0.01 | 0.17 | 0.12 | C | 45 | 1 | 0.0078 |
| | 7 | 0.5 | 11.0 | 0.15 | 0.00008 | 0.17 | 0.12 | C | 42 | 0 | 0.000052 |
| | 8 | 0.5 | 9.0 | 0.15 | 0.13 | 0.17 | 0.12 | C | — | — | 0.0845 |
| | 9 | 0.5 | 11.0 | 0.15 | 0.0005 | 0.03 | 0.04 | E | 38 | 0 | 0.000325 |
| | 10 | 0.5 | 11.0 | 0.15 | 0.0005 | 0.4 | 0.20 | E | 38 | 0 | 0.000325 |
| | 11 | 0.5 | 9.0 | 0.15 | 0.01 | 0.17 | 0.12 | G | 33 | 0 | 0.0065 |
| | 12 | 0.5 | 9.0 | 0.15 | 0.005 | 0.17 | 0.12 | I | 36 | 0 | 0.00325 |
| | 13 | 0.5 | 10.0 | 0.20 | 0.01 | 0.15 | 0.10 | B | — | — | 0.007 |
| | 14 | 0.5 | 11.0 | 0.20 | 0.008 | 0.12 | 0.07 | C | 37 | 0 | 0.0056 |
| | 15 | 0.5 | 10.0 | 0.20 | 0.006 | 0.17 | 0.12 | C | — | — | 0.0042 |
| | 16 | 0.3 | 11.0 | 0.20 | 0.01 | 0.17 | 0.12 | A | 42 | 0 | 0.005 |
| | 17 | 0.3 | 11.0 | 0.20 | 0.005 | 0.17 | 0.12 | D | 45 | 0 | 0.0025 |
| | 18 | 0.3 | 10.5 | 0.20 | 0.01 | 0.13 | 0.08 | B | — | — | 0.005 |
| | 19 | 1.2 | 9.5 | 0.20 | 0.08 | 0.17 | 0.12 | B | — | — | 0.112 |
| | 20 | 1.5 | 11.0 | 0.20 | 0.06 | 0.17 | 0.12 | B | — | — | 0.102 |
| | 21 | 0.3 | 10.0 | 0.15 | 0.01 | 0.15 | 0.10 | K | 12 | 3 | 0.0045 |
| | 22 | 0.3 | 11.0 | 0.15 | 0.007 | 0.17 | 0.12 | N | 17 | 5 | 0.00315 |
| | 23 | 0.5 | 11.0 | 0.20 | 0.007 | 0.17 | 0.12 | O | 16 | 4 | 0.0049 |
| | 24 | 0.5 | 9.0 | 0.20 | 0.01 | 0.17 | 0.12 | L | 15 | 7 | 0.007 |
| | 25 | 0.5 | 9.0 | 0.15 | 0.008 | 0.2 | 0.15 | M | 15 | 6 | 0.0052 |
| | 26 | 0.5 | 11.0 | 0.15 | 0.01 | 0.17 | 0.12 | K | 13 | 5 | 0.0065 |
| | 27 | 0.5 | 10.5 | 0.12 | 0.006 | 0.17 | 0.12 | N | 18 | 3 | 0.00372 |
| | 28 | 0.01 | 11.0 | 0.15 | 0.0005 | 0.17 | 0.12 | E | 39 | 0 | 0.00008 |
| | 29 | 0.5 | 14.0 | 0.20 | 0.005 | 0.3 | 0.25 | G | 55 | 1 | 0.0035 |
| | 30 | 1.5 | 12.0 | 0.20 | 0.007 | 0.2 | 0.19 | H | 55 | 0 | 0.0119 |

TABLE 5

| Specimen No. | | Si | Mg | Mn | Cu | Fe | Zn |
|---|---|---|---|---|---|---|---|
| Comparative Example | 1 | 0.7 | 0.2 | 1.2 | 0.05 | 0.2 | 0.5 |
| | 2 | 0.7 | 0.5 | 1.2 | 0.05 | 0.2 | 0.5 |
| | 3 | 0.7 | 0.5 | 1.2 | 0.05 | 0.2 | 0.5 |
| | 4 | 0.7 | 0.5 | 1.1 | 0.05 | 0.2 | 0.5 |
| | 5 | 0.7 | 0.5 | 1.2 | 0.01 | 0.2 | 0.5 |
| | 6 | 0.7 | 0.5 | 1.2 | 0.05 | 0.2 | 0.9 |
| | 7 | 0.7 | 0.5 | 1.2 | 0.05 | 0.2 | 0.9 |
| | 8 | 0.7 | 0.5 | 1.2 | 0.05 | 0.2 | 0.6 |
| | 9 | 0.7 | 0.5 | 1.2 | 0.05 | 0.2 | 1.1 |
| | 10 | 0.7 | 0.5 | 1.2 | 0.05 | 0.2 | 1.1 |
| | 11 | 0.005 | 0.5 | 1.2 | 0.05 | 0.2 | 0.6 |
| | 12 | 1.2 | 0.5 | 1.2 | 0.02 | 0.2 | 0.6 |
| | 13 | 0.7 | 0.75 | 1.2 | 0.05 | 0.2 | 0.6 |
| | 14 | 0.7 | 0.2 | 0.7 | 0.05 | 0.2 | 0.8 |
| | 15 | 0.7 | 0.2 | 1.9 | 0.05 | 0.2 | 0.9 |
| | 16 | 0.1 | 0.3 | 1.4 | 0.35 | 0.2 | 0.9 |
| | 17 | 0.5 | 0.3 | 1.2 | 0.05 | 0.05 | 0.9 |
| | 18 | 0.5 | 0.3 | 1.4 | 0.05 | 0.7 | 0.9 |
| | 19 | 0.7 | 0.5 | 1.3 | 0.05 | 0.2 | 0.9 |
| | 20 | 0.7 | 0.5 | 1.3 | 0.05 | 0.2 | 0.9 |
| | 21 | 0.4 | 0.5 | 1.4 | 0.05 | 0.2 | 0.8 |
| | 22 | 0.4 | 0.5 | 1.4 | 0.03 | 0.2 | 0.8 |
| | 23 | 0.7 | 0.5 | 1.2 | 0.05 | 0.2 | 0.9 |
| | 24 | 0.7 | 0.5 | 1.2 | 0.05 | 0.2 | 1.1 |
| | 25 | 0.7 | 0.5 | 1.2 | 0.05 | 0.2 | 0.9 |
| | 26 | 0.7 | 0.5 | 1.2 | 0.04 | 0.2 | 0.9 |
| | 27 | 0.7 | 0.5 | 1.3 | 0.05 | 0.2 | 1.1 |
| | 28 | 0.7 | 0.15 | 1.1 | 0.05 | 0.2 | 0.9 |
| | 29 | 0.07 | 0.5 | 1.5 | 0.05 | 0.2 | 0.7 |
| | 30 | 0.7 | 0.3 | 1.5 | 0.0006 | 0.2 | 0.6 |

TABLE 6

| Specimen No. | | Concentration of Mg on surface of brazing material (wt %) | Brazability | | | Corrosion resistance | | | Strength after brazing | |
|---|---|---|---|---|---|---|---|---|---|---|
| | | | Joint ratio | Fillet length | Coarse Si particles | Cathode current density | Corrosion weight loss | Sacrificial Anode Effect | [MPa] | Evaluation |
| Comparative Example | 1 | 0.1 | X | E | A | 0.08 | B | A | 143 | C |
| | 2 | 1.05 | X | E | A | 0.09 | A | A | 161 | A |
| | 3 | 0.5 | ○ | E | A | 0.08 | A | A | 162 | A |
| | 4 | 0.4 | X | E | C | 0.09 | C | A | 158 | B |
| | 5 | 0.17 | ○ | E | A | 0.08 | B | A | 159 | B |
| | 6 | 0.5 | X | E | A | 0.08 | A | A | 162 | A |
| | 7 | 0.5 | X | E | C | 0.08 | A | A | 165 | A |
| | 8 | Evaluation material cannot be manufactured and evaluated. | | | | | | | | |
| | 9 | Not good since base metal cost is too expensive | | | | | | | | |
| | 10 | 0.5 | ○ | A | B | 0.2 | D | A | 162 | A |
| | 11 | Not good since base metal cost is too expensive | | | | | | | | |
| | 12 | 0.5 | Poor brazing due to generation of significant erosion | | | 0.08 | A | A | 190 | A |
| | 13 | Evaluation material cannot be manufactured and evaluated. | | | | | | | | |
| | 14 | 0.5 | ○ | A | A | 0.08 | A | A | 139 | D |
| | 15 | Evaluation material cannot be manufactured and evaluated. | | | | | | | | |
| | 16 | 0.3 | ○ | B | A | 0.08 | D | A | 161 | B |
| | 17 | Not good since base metal cost is too expensive | | | | | | | | |
| | 18 | Evaluation material cannot be manufactured and evaluated. | | | | | | | | |
| | 19 | Evaluation material cannot be manufactured and evaluated. | | | | | | | | |
| | 20 | Evaluation material cannot be manufactured and evaluated. | | | | | | | | |
| | 21 | 0.4 | ○ | E | A | 0.08 | B | A | 161 | A |
| | 22 | 0.4 | ○ | E | A | 0.08 | B | A | 161 | A |
| | 23 | 0.5 | ○ | E | A | 0.08 | B | A | 162 | A |
| | 24 | 0.5 | ○ | E | A | 0.08 | B | A | 162 | A |
| | 25 | 0.5 | ○ | E | A | 0.08 | B | A | 162 | A |
| | 26 | 0.5 | ○ | E | A | 0.08 | B | A | 162 | A |
| | 27 | 0.5 | ○ | E | A | 0.08 | B | A | 163 | A |
| | 28 | 0.08 | X | E | A | 0.08 | A | A | 139 | D |
| | 29 | 0.5 | ○ | C | B | 0.13 | E | A | 162 | A |
| | 30 | 0.86 | ○ | D | A | 0.11 | E | A | 165 | A |

TABLE 7

| | Specimen No. | Casting condition Molten metal temperature (° C.) | Homogenization condition Temperature and time (° C., h) | Hot rolling condition Rolling time between 400° C. and 500° C. (min) | Equivalent strain ε | Finish temperature (° C.) | Cooling rate (° C./h) |
|---|---|---|---|---|---|---|---|
| Target range | A | 710 | 450° C., 5 h | 15 | 5.7 | 320 | 25 |
| | B | 715 | 450° C., 5 h | 14 | 5.4 | 334 | 21 |
| | C | 715 | 500° C., 2 h | 10 | 5.5 | 355 | 35 |
| | D | 725 | 550° C., 2 h | 14 | 5.5 | 274 | 28 |
| | E | 725 | 400° C., 8 h | 18 | 5.9 | 290 | 38 |
| | F | 735 | 400° C., 8 h | 22 | 5.7 | 252 | 35 |
| | G | 735 | 450° C., 8 h | 15 | 6.1 | 315 | 42 |
| | H | 720 | 450° C., 8 h | 24 | 5 | 340 | 34 |
| | I | 755 | 500° C., 5 h | 14 | 6.4 | 347 | 52 |
| | J | 745 | 500° C., 5 h | 30 | 5 | 290 | 32 |
| Outside the target | K | 695 | 400° C., 8 h | 15 | 5.3 | 267 | 18 |
| | L | 680 | 380° C., 8 h | 8 | 5.2 | 220 | 12 |
| | M | 715 | 380° C., 8 h | 22 | 4.8 | 337 | 36 |
| | N | 670 | 350° C., 8 h | 15 | 4.6 | 395 | 22 |
| | O | 705 | 350° C. 8 h | 7 | 5.7 | 322 | 35 |

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SIGNS LIST

1: Aluminum alloy clad material
2: Aluminum alloy core material
3A: Aluminum alloy brazing material
3B: Aluminum alloy brazing material
5: Aluminum heat exchanger
6: Fin
7: Tube
10: Other components
11: Fin
12: Tube
13: Joint

What is claimed is:

1. An aluminum alloy clad material comprising:
an Al—Si—Mg—Bi brazing material disposed on both surfaces of a core material wherein the Al—Si—Mg—B brazing material comprises, by mass %, from 6.0% to 14.0% of Si, from 0.05% to 0.3% of Fe, from 0.02% to 1.5% of Mg, from 0.05% to 0.25% of Bi, from 0.0001% to 0.1% of Sr, and a balance consisting of Al and inevitable impurities, and satisfies a relationship of (Bi+Mg)×Sr≤0.1 in amounts of elements by mass %,
wherein the Al—Si—Mg—Bi brazing material comprises more than 20 in number per 10,000-μm² visual field of Mg—Bi compounds having a diameter of from 0.1 μm to less than 5.0 μm in terms of equivalent circle diameter and less than 2 in number per 10,000-μm² visual field of the Mg—Bi compounds having a diameter of 5.0 μm or more, when observed in a surface layer plane direction before brazing, and
the core material comprises, by mass %, from 0.8% to 1.8% of Mn, from 0.01% to 1.0% of Si, from 0.1% to 0.5% of Fe, and a balance consisting of Al and inevitable impurities, and a cathode current density of a brazing material layer measured at room temperature in a 5% NaCl solution at a pH of 3 after a brazing heat treatment is 0.1 mA/cm² or less.

2. The aluminum alloy clad material according to claim 1, wherein the core material further comprises, by mass %, from 0.005% to 0.3% of Cu.

3. The aluminum alloy clad material according to claim 1, wherein the core material further comprises, by mass %, from 0.1% to 0.7% of Mg.

4. The aluminum alloy clad material according to claim 2, wherein the core material further comprises, by mass %, from 0.1% to 0.7% of Mg.

5. The aluminum alloy clad material according to claim 1, wherein the core material further comprises, by mass %, from 0.2% to 1.6% of Zn.

6. The aluminum alloy clad material according to claim 2, wherein the core material further comprises, by mass %, from 0.2% to 1.6% of Zn.

7. The aluminum alloy clad material according to claim 3, wherein the core material further comprises, by mass %, from 0.2% to 1.6% of Zn.

8. The aluminum alloy clad material according to claim 4, wherein the core material further contains, by mass %, from 0.2% to 1.6% of Zn.

9. The aluminum alloy clad material according to claim 1, wherein the brazing material further comprises, by mass %, from 0.05% to 0.3% of Mn.

10. The aluminum alloy clad material according to claim 2, wherein the brazing material further comprises, by mass %, from 0.05% to 0.3% of Mn.

11. The aluminum alloy clad material according to claim 3, wherein the brazing material further comprises, by mass %, from 0.05% to 0.3% of Mn.

12. The aluminum alloy clad material according to claim 4, wherein the brazing material further comprises, by mass %, from 0.05% to 0.3% of Mn.

13. The aluminum alloy clad material according to claim 5, wherein the brazing material further comprises, by mass %, from 0.05% to 0.3% of Mn.

14. The aluminum alloy clad material according to claim 6, wherein the brazing material further comprises, by mass %, from 0.05% to 0.3% of Mn.

15. The aluminum alloy clad material according to claim 7, wherein the brazing material further comprises, by mass %, from 0.05% to 0.3% of Mn.

16. The aluminum alloy clad material according to claim 8, wherein the brazing material further comprises, by mass %, from 0.05% to 0.3% of Mn.

17. The aluminum alloy clad material according to claim 1, wherein a concentration of Mg on a surface of the brazing material at a braze melting temperature is from 0.15% to 1.0%.

18. The aluminum alloy clad material according to claim 3, wherein a concentration of Mg on a surface of the brazing material at a braze melting temperature is from 0.15% to 1.0%.

19. The aluminum alloy clad material according to claim 5, wherein a concentration of Mg on a surface of the brazing material at a braze melting temperature is from 0.15% to 1.0%.

20. The aluminum alloy clad material according to claim 7, wherein a concentration of Mg on a surface of the brazing material at a braze melting temperature is from 0.15% to 1.0%.

21. The aluminum alloy clad material according to claim 1, wherein the Al—Si—Mg—B brazing material comprises, by mass %, from 0.03% to 1.5% of Mg.

22. The aluminum alloy clad material according to claim 1, wherein the Al—Si—Mg—B brazing material comprises, by mass %, from 0.05% to 1.5% of Mg.

23. The aluminum alloy clad material according to claim 1, wherein the Al—Si—Mg—B brazing material comprises, by mass %, from 0.1% to 1.5% of Mg.

* * * * *